(12) United States Patent
Hochhausen et al.

(10) Patent No.: US 7,397,237 B2
(45) Date of Patent: Jul. 8, 2008

(54) DETERMINING THE POSITION OF THE ROTOR IN AN ELECTRIC MOTOR

(75) Inventors: Ralf Hochhausen, Ingolstadt (DE); Jörg Seyfarth, Regensburg (DE); Pietro de Filippis, Milan (IT)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/581,237

(22) PCT Filed: Dec. 8, 2004

(86) PCT No.: PCT/EP2004/005334

§ 371 (c)(1),
(2), (4) Date: May 29, 2007

(87) PCT Pub. No.: WO2005/060069

PCT Pub. Date: Jun. 30, 2005

(65) Prior Publication Data

US 2007/0222434 A1    Sep. 27, 2007

(30) Foreign Application Priority Data

Dec. 9, 2003 (DE) ................................ 103 57 504

(51) Int. Cl.
*G01B 7/30* (2006.01)
*G01P 3/66* (2006.01)

(52) U.S. Cl. ............... 324/207.25; 324/173; 324/179

(58) Field of Classification Search ................
324/207.11–207.26, 173, 179; 318/400.13–400.14, 318/490
See application file for complete search history.

(56) References Cited

U.S. PATENT DOCUMENTS

| 4,295,085 A | 10/1981 | Lafuze |
| 4,631,456 A | 12/1986 | Drescher et al. |

(Continued)

FOREIGN PATENT DOCUMENTS

| EP | 0 802 622 | 10/1997 |
| EP | 0 893 877 | 1/1999 |

(Continued)

OTHER PUBLICATIONS

International Search Report PCT/EP2004/053348, no date.

(Continued)

*Primary Examiner*—Reena Aurora
(74) *Attorney, Agent, or Firm*—Russell W. Warnock; James E. Howard

(57) ABSTRACT

Device for determining the position of the rotor in an electric motor comprises a detector, which is mounted on the electric motor and which is sensitive to the passage of the rotor through a reference position, and comprises a phase-locking loop, which can be synchronized with the output signal of the detector and which furnishes an output signal representative of the position of the rotor. The moments when the rotor passes through a reference position are detected, the period of the oscillator is adapted in such a manner that the reference position passages occur at a predetermined phase of the oscillator, and the position of the rotor is derived from the oscillation of the oscillator between the reference position passages.

10 Claims, 3 Drawing Sheets

U.S. PATENT DOCUMENTS

2002/0185986 A1  12/2002  Seki
2003/0062863 A1  4/2003  Huang et al.

FOREIGN PATENT DOCUMENTS

JP   8-70564   3/1996
WO   WO 97/08818   3/1997

OTHER PUBLICATIONS

Zou, Jibin et al, Speed-Stabilization Control Of A High-Speed PM Synchronous Motor Without High-Precision Sensors, Conference on Computers, Communications, Control and Power Engineering, Okt. 2002, S.2011-2014, vol. 3.28-31, Department of Electrical Engineering, Harbin Institute of Technology, Harbin, China, no date.

DETERMINING THE POSITION OF THE ROTOR IN AN ELECTRIC MOTOR

The present invention relates to a method and a device for determining the position of the rotor in an electric motor.

A precise knowledge of the position of the rotor is of crucial importance for the operation of a brushless electric motor whose speed is determined by the frequency of a supplied alternating voltage in order to be able to start such a motor without using an auxiliary motor and operate it at arbitrarily definable speeds. A conventional technique for determining the rotor position involves attaching a plurality of Hall sensors in the proximity of a tacho disk equipped with magnets which is affixed on the shaft of the motor, which sensors each display the passage of a north or south pole of a magnet of the tacho disk by a signal pulse or a level change of a continuous signal. The number of magnet poles of this type of tacho wheel is generally the same as that of the rotor.

The energy supply of the motor is generally accomplished by means of an electronic AC/DC inverter which electrically generates a sequence of six switching states at an angular spacing of 60° for each 360° rotation of the magnetic field in the motor (corresponding to a rotation of the shaft of 360°/n for a motor with n pairs of poles). The sequence of switching states generates a rotating magnetic field in the motor which continues to turn electrically from one switching state to the next in steps of 60°. When the rotor turns further through 360°/n in accordance with a complete rotation of the magnetic field, a single Hall sensor only delivers two pulses. However, since six switching states alternate in the course of a rotation of the magnetic field, six switching pulses are required per complete rotation of the magnetic field in order to trigger the transition from one switching state to the next. In order to generate these switching pulses respectively in the correct phase, it is known to arrange a total of three Hall sensors respectively in a solid angle of 120°/n in relation to one another on the tacho disk. These three sensors deliver switching pulses for switching the AC/DC inverter from one state to the next at angular distances of the shaft of 120°/n.

These three sensors are naturally costly and require time and particularly space for installation, which is not necessarily always available. A further problem is that inaccuracies in the arrangement of the magnets on the tacho disk can have the result that the time intervals between two switching pulses vary periodically in the course of rotation of the shaft, resulting in non-uniform running of the motor and therefore increased noise emission.

It is the object of the invention to provide a method and a device for detecting the position of the rotor in an electric motor, which can determine the exact position at low cost and which requires little space, especially in the neighbourhood of the rotor.

The object is achieved by a method or a device having the features claimed below.

The tunable oscillator can replace all the sensors conventionally arranged on the rotor apart from a single one which is required to deliver a reference period to which the oscillator can be tuned. Since the oscillator need not be disposed in the immediate neighbourhood of the rotor, space is saved in the vicinity thereof which allows the electric motor to be built more compactly. Furthermore, as a result of the reduced space requirement of the single detector according to the invention compared with the conventional three detectors, the detector can also be placed directly on the magnet of the rotor so the costs and space requirement of a tacho disk are dispensed with and errors in the determination of reference position passages which are attributable to inaccuracies in the arrangement of the magnets on the tacho disk are avoided.

The method according to the invention can be implemented using a phase-locking loop (PLL) circuit known per se where the phase of the oscillator is detected on each passage of the rotor through the reference position and the tuning frequency of the oscillator is corrected by means of the detected deviation.

A simple PLL circuit would require a plurality of rotations of the electric motor before it locks to the frequency of the rotor and can serve as a frequency standard for deriving the magnetic field control. This locking is speeded up considerably by measuring the time duration between two reference transition passages and the time derived from this time duration is pre-defined as the period of the oscillator. Thus, when starting the motor according to the invention, two reference position passages are sufficient to obtain a usable estimate of the period which can be used as the basis for the further operation of the tunable oscillator.

In a motor having a plurality n of rotor pole pairs, manufacturing tolerances can have the result that even if the rotational speed of the motor is exactly constant, the time durations measured between two reference position passages can fluctuate rhythmically. In order to limit the influence of these fluctuations, when deriving the time to be predefined as the oscillator period from the times of the reference position passages, it is appropriate to provide a step where the time durations determined for respectively n successive reference position passages are averaged.

If the speed of the motor is to be regulated up or down, the time duration measured between two reference position passages is not constant but decreases or increases continuously. This can easily be taken into account when determining the rotor position by determining the time which has elapsed since the previous passage for each transition of the rotor through the reference position, calculating the difference between this time duration and a time duration determined for the previous passage and correcting the time derived as the oscillator period by adding hereto the difference weighted by a positive factor. This factor is preferably selected to be about 0.5.

The derived rotor position can appropriately be used to control the time profile of the supply voltages applied to several phases of the motor. This control preferably consists in applying to the phases of the motor, a pattern consisting of a sequence of discrete switching states, which are repeated cyclically with the detected period, where switching from one of the states to the next takes place in each case at a predefined rotor position.

A preferred area of use of the invention is motors for household appliances, especially for washing machines.

Further features and advantages of the invention are obtained from the following description of the exemplary embodiments with reference to the appended figures. In the figures.

Figure 1:
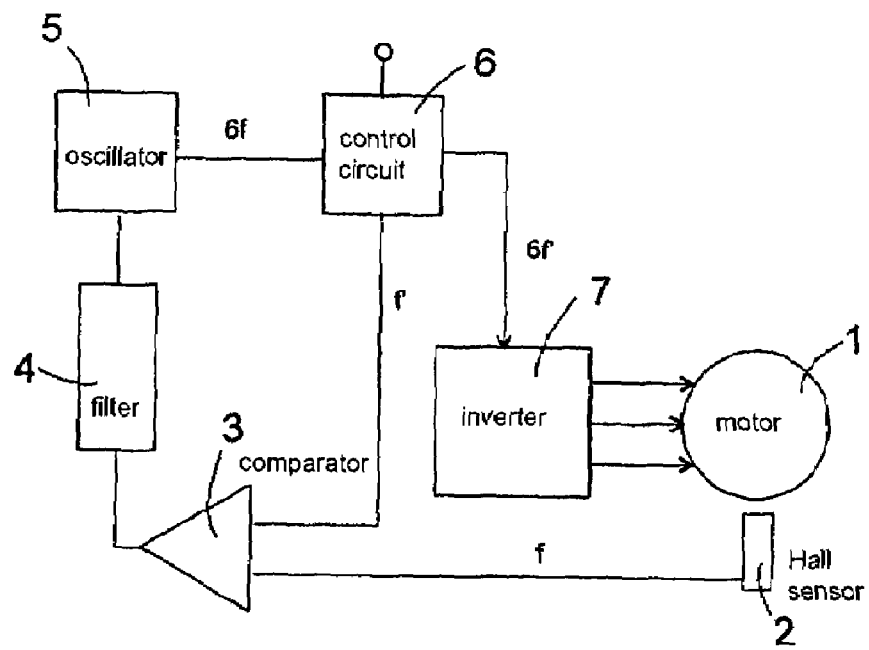
FIG. 1 is a highly schematic diagram of a device according to the invention for detecting the position of the rotor and an electric motor controlled using the device.

In the block diagram in FIG. 1, 1 designates a brushless DC motor whose rotor has n=4 pairs of poles. The DC motor 1 i supplied by an AC/DC inverter 7 whose switches are brought by control circuit 6 in a cyclically alternating manner into six different states each corresponding to magnetic fields in the motor 1 electrically phase-shifted with respect to one another by 60°. A Hall sensor 2 is disposed in the neighbourhood of the rotor to detect the field of each individual pole of the rotor which passes thereby. The Hall sensor 2 delivers an output signal which has an ascending flank in each case when passing a first type of pole and a descending flank when passing the other type of pole. The frequency f of the output signal of the Hall sensor 2 is thus n times the rotational frequency of the motor 1.

The output signal of the Hall sensor 2 is applied to a first input of a phase comparator 3 whose second input is supplied with a comparison signal whose formation will be explained. The phase comparator 3 can be formed, for example, by an electronic counter which begins to count pulses of a clock signal whenever a descending signal flank arrives from the Hall sensor, the frequency of this signal being a multiple of the frequency f, until a descending signal flank is received at the second signal input and outputs the counter result as the measured value for a phase difference between the two signals. The output of the phase comparator 3 smoothed by a low-pas filter 4 controls a voltage-controlled oscillator 5. In the steady-state mode, this oscillator delivers the comparison signal with the frequency f.

As a result of a first embodiment, the comparison signal has a form which allows the phase to be deduced from the signal level at any time, for example, a saw-tooth, triangular or sinusoidal shape. The control circuit 6 receives the comparison signal of the oscillator 5 and compares it with a series of reference levels, which correspond for example to the phases 0°, 60°, 120°, . . . , 300° in order to thus detect the corresponding phases and change the state of the switches of the AC/DC inverter 7 at these phases.

As a result of a second embodiment, the oscillator 5 generates a principal oscillation having the frequency 6f in the steady-state mode and has a count-down oscillator which produced the comparison signal having the frequency f from this principal oscillation. Each period of the principal oscillation thus indicates a rotation of the rotor by 60°. With each period of the principal oscillation, the control circuit switches from one switching state of the AC/DC inverter to the next using the rotor position thus determined.

Figure 2:
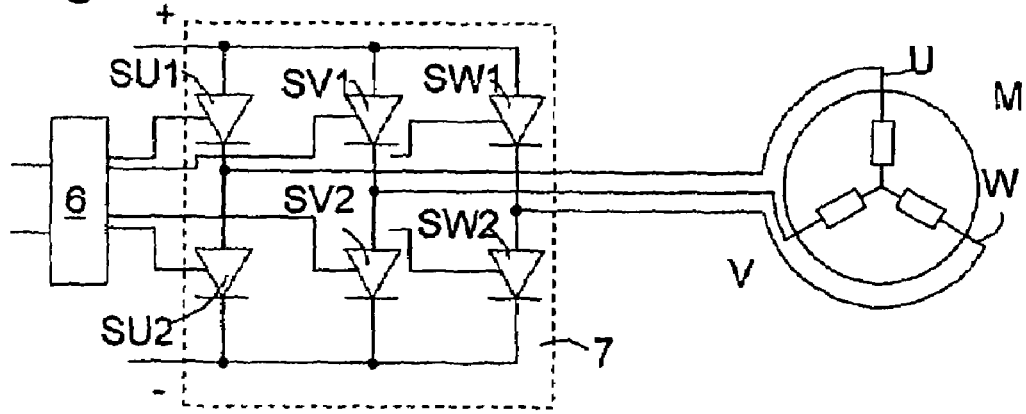
FIG. 2 is a schematic circuit diagram of an AC/DC inverter used in the device in FIG. 1.

FIG. 2 is a schematic diagram showing the AC/DC inverter 7. This comprises six switches SU1, SV1, SW1, SU2, SV2, SW2 of which the switches SU1, SV1, SW1 are respectively arranged between a positive supply terminal (+) and a phase U, V or W of the motor 1 and the switches SU2, SV2, SW2 are each arranged between one of these three phases and a negative supply terminal (−). The switches can be IGBTs with a suppressor diode connected in parallel in a manner known per se.

Figure 3:
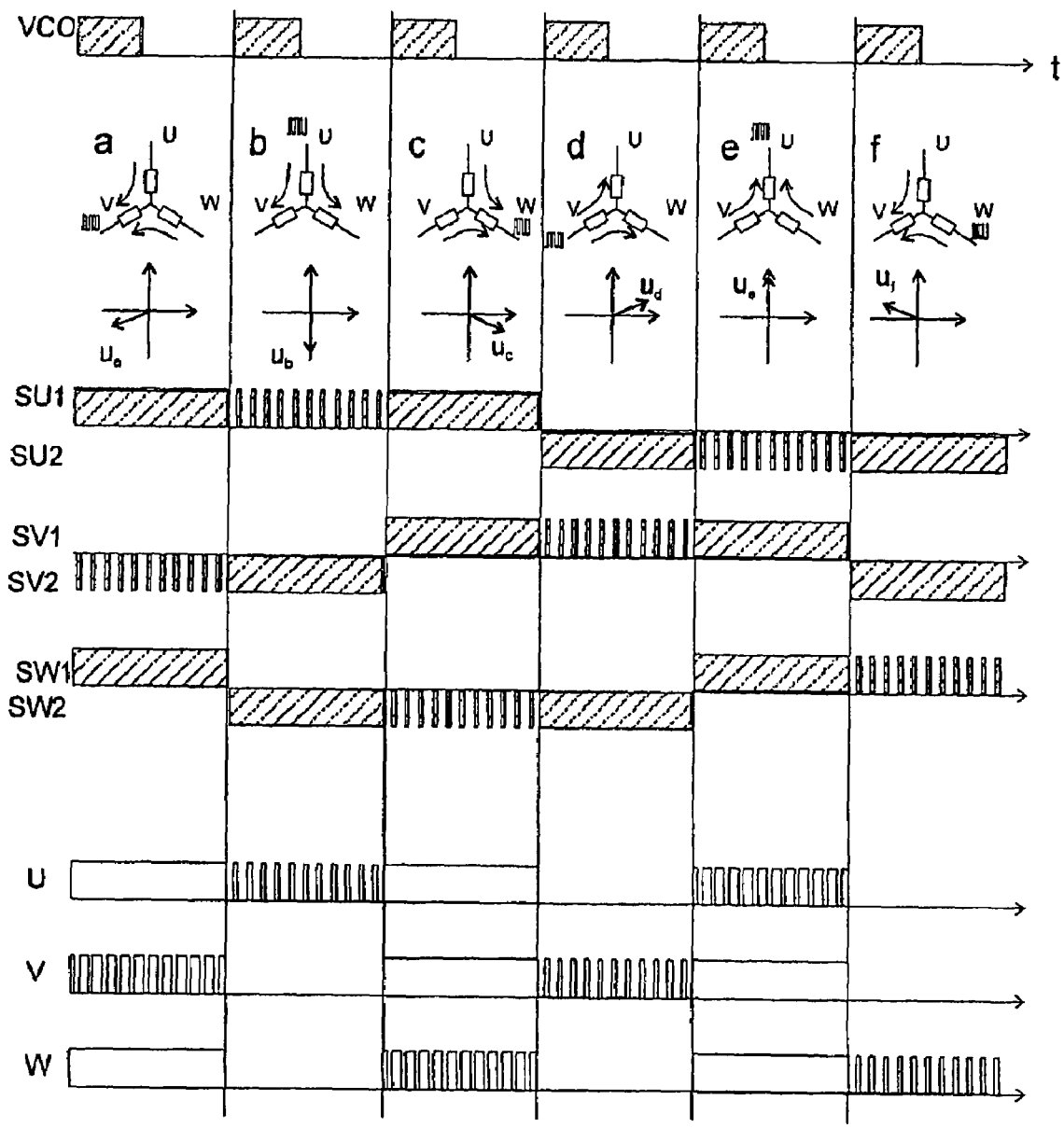
FIG. 3 shows the time sequence of the cyclically repeated switching states applied to the motor.

In the time diagram in FIG. 3, VCO shows the principal oscillation of the voltage-controlled oscillator 5 on whose ascending flank the control circuit 6 responds by changing 30 from one of six cyclically successively produced switching states a, b, c, d, e, f to the next.

For each of the switching states a to f, FIG. 3 shows the state of the switch of the AC/DC inverter 7 and the voltages resulting therefrom at the phases U, V, W of the electric motor 1. In state a the switches SU1, SW1 are closed. The switches SU2, SW2, SV1 are open and the switch SV2 is opened and closed in pulsed mode. According to the pulse duty factor of the switch SV2, current flows through the phases U, V or W, v of the motor and the resulting magnetic fields are superposed to form a space vector $u_a$. In the following switching state b, the switches SV2, SW2 are open, SU2, SV1, SW1 are closed and SU1 is pulse-width-modulated; accordingly current flows through the phases U, V and U, W and results in a space vector $u_b$ which is turned through 60° in the anticlockwise direction compared with $u_a$. The closed, open, pulse-width-modulated, states of the switches for states c, d, e, f and the resulting current distributions and space vectors can be read off from FIG. 3 and do not need to be explained here in detail. It is important that six periods of the VCO signal produce a rotation of the space vector through 360°.

Naturally, the states of the AC/DC inverter 7 controlled by the control circuit 6 can be different from those shown in FIG. 3, in particular, although less preferred, a state pattern can be considered where each phase U, V, W of the motor 1 is kept current-free for the length of respectively one state by opening both allocated switches, then connected to the positive supply voltage for the length of two states, then kept current-free for the length of one state again and finally connected to the negative supply terminal for the length of two states and the three phases are phase-shifted with respect to one another by respectively two states.

The device in FIG. 1 reliably shows the positions of the rotor at which the space vector in the motor needs to be switched further, in the case of a uniformly rotating motor but problems can arise if changes in speed result in a loss of phase coupling or phase coupling must first be established during starting up of the motor.

Figure 4:
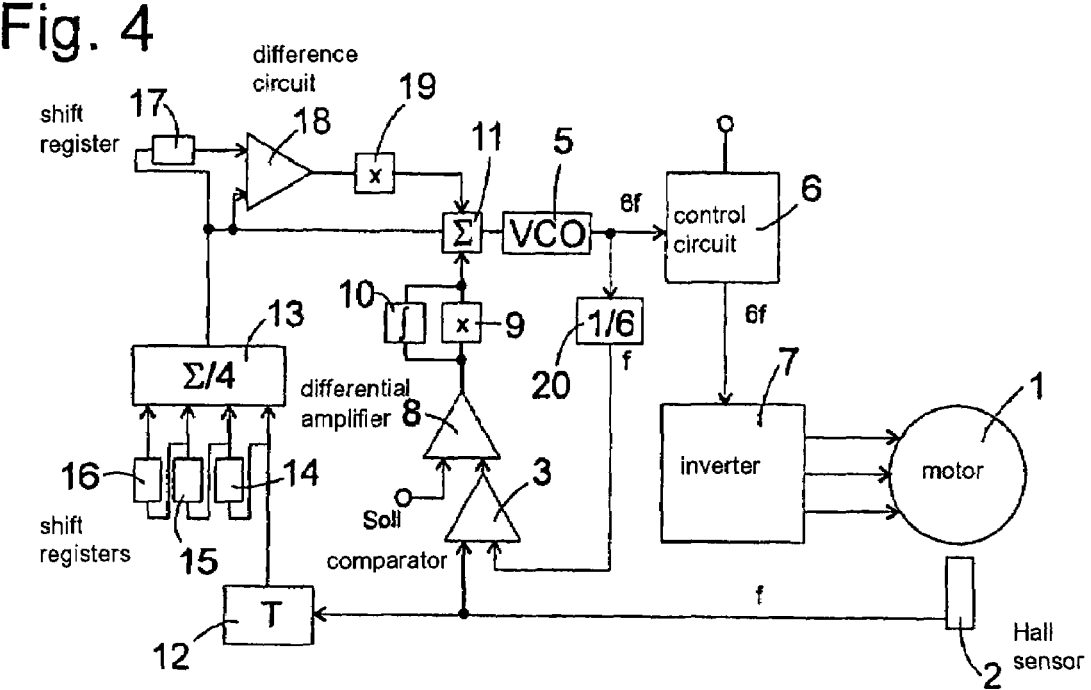
FIG. 4 is a block diagram of a preferred embodiment of the device for detecting the rotor position and an electric motor controlled using this device.

A further developed embodiment which avoids this and other problems is shown in FIG. 4. Components of the device from FIG. 4 which have already been described with reference to FIG. 1, have the same reference symbols and are not treated again.

The output signal of the phase comparator 3 here forms the non-inverted input signal of a differential amplifier 8 to whose inverting input a "desired" signal representative of a desired phase shift is applied externally. This external signal can be used to adjust an arbitrary rake angle between the rotor of the motor 1 and the rotating magnetic field in the motor.

The low-pass filter 4 here is a proportional/integral controller consisting of a weighting part 9 which multiplies the output signal of the differential amplifier 8 with a pre-determined weighting factor, and an integrator 10 for integrating the output signal of the differential amplifier 8. The additively superposed output signals from the weighting part 9 and integrator 10 are fed to a voltage-controlled oscillator 5 as a frequency-controlled signal together with further contributions added in an adder 11.

In addition to the phase comparator 3, a period measuring circuit 12 is connected to the output of the Hall sensor 2, which circuit measures the time between two successive descending flanks of the signal from the Hall sensor 2 and delivers this as an output signal to an average value circuit 13 and a first shift register 14. Connected to the output of the first shift register is an input of a second shift register 15 and a second input of the average value circuit 13; connected to the output of the second shift register is a third shift register 16 and a third input of the average value circuit 13, and at the output of the third shift register a fourth input of the average value circuit 13. With each new period measured value supplied by the measuring circuit 12, this triggers the shift registers 14, 15, 16 so that these take over and output the measured value respectively applied to their input. Thus, the four most recent measured values of period durations of the Hall sensor signal are always applied to the inputs of the average value circuit 13. The average value circuit 13 delivers the average of these measured values at its output. (In general, if the number of pairs of rotors is n, n inputs and n-1 shift registers are always provided so that averaging is performed over the number of periods of the Hall sensor signal which corresponds to a complete revolution of the rotor). Cyclic fluctuations in the period duration which can result from non-uniformities in the arrangement of the four pairs of poles of the rotor are thus eliminated in the output signal of the average value circuit 13. This output signal makes a substantial contribution to the input voltage of the voltage-controlled oscillator 5. Thus, after two passages of the rotor through the reference position, an input voltage is applied to the oscillator 5 which is not far removed from the input voltage which would be established in the steady-state mode and the frequency of the oscillator 5 can rapidly lock to that of the rotor.

The output of the average value circuit 13 is further connected to a difference circuit 18, on the one hand directly and on the other hand via a fourth shift register 17 which is triggered in a similar manner to the shift registers 14 to 16 so that the difference circuit 18 delivers the difference between two successive averaged periods of the Hall sensor signal as an output signal. The output signal of the difference circuit 18 thus corresponds to the average variation of the period duration and indicates an accelerated or slowed running of the motor 1. This accelerated or slowed running is taken into account by adding the output signal of the difference circuit 18, weighted by a factor of 0.5 in a weighting part 19, to the afore-mentioned contributions to the input signal of the oscillator 5 in the adder 11. Thus, the oscillation of the oscillator 5 already allows for a variation of the period duration which is to be expected in extrapolation of the past but has not yet been measured. The control of the electric motor by means of the control circuit 6 and the AC/DC inverter 7 is the same as in the case in FIG. 1 where FIG. 4 merely shows the 1:6 count-down oscillator 20 which delivers the comparison signal for the phase comparator 3, as a circuit component separate from the remainder of the control circuit 6.

The invention claimed is:

1. A method for determining a position of a rotor in an electric motor comprising the following acts:
   detecting when the rotor passes through a reference position;
   adapting a period of a tunable oscillator so that passages of the rotor through the reference position occur at a predetermined phase of the oscillator; and
   deriving a rotor position between the reference position passages from oscillation of the oscillator, wherein a time duration between two reference position passages is measured and a time is derived from this time duration, the derived time being predetermined as the period of the oscillator, wherein the rotor has n pole pairs and the reference position in each corresponds to passage of a pole of each pole pair at a detector and wherein derivation of the time comprises an act of averaging time durations determined from n successive reference position passages.

2. The method according to claim 1, wherein on each passage of the rotor through the reference position, the phase of the oscillator is detected and the tuning frequency of the oscillator is corrected using the detected phase.

3. The method according to claim 1, wherein for each passage of the rotor through the reference position, the time which has elapsed since the previous passage is determined, the difference between the elapsed time and a time duration determined for the previous passage is calculated and the time derived as the oscillator period is corrected by adding thereto the difference weighted by a positive factor.

4. The method according to claim 3, wherein the factor is between 0.3 and 0.7.

5. The method according to claim 1, wherein a time profile of supply voltages applied to a plurality of phases of the motor is controlled using the derived rotor position.

6. The method according to claim 5, wherein the supply voltages are controlled according to a pattern consisting of a sequence of discrete states, which are repeated cyclically with a detected period, wherein switching from one of the states to the next takes place in each case at a predefined rotor position.

7. The method according to claim 1, wherein the motor is of a household appliance.

8. A device for determining a rotor position in an electric motor, comprising a detector disposed on the electric motor which is sensitive to passage of the rotor through a reference position, and a phase-locking loop which can be synchronized to an output signal of the detector, which delivers an output signal representative of the position of the rotor, wherein the phase-locking loop comprises a tunable oscillator, a phase comparator for delivering a correction signal representative of a phase difference between an output signal of the detector and an output signal of the tunable oscillator, a low-pass filter for the correction signal, a time-measuring circuit for determining a period duration between two passages of the rotor through the reference position and a superposition circuit for superposing an output signal of the time-measuring circuit representative of the determined period duration and the low-pass-filtered correction signal to produce a tuning signal for the oscillator, wherein the time-measuring circuit comprises an average value circuit for forming an average of time intervals between n successive passages of the rotor through the reference position.

9. The device according to claim 8, wherein the detector is arranged in the magnetic field of the rotor.

10. The device according to claim 8, wherein the time-measuring circuit determines the time which has elapsed since the previous passage for each passage of the rotor through the reference position, calculates the difference between the elapsed time and a time duration determined for the previous passage and corrects a time derived as the oscillator period by adding thereto the difference weighted by a positive factor.

* * * * *